US008448601B2

(12) United States Patent
Boyer et al.

(10) Patent No.: US 8,448,601 B2
(45) Date of Patent: May 28, 2013

(54) CONVERTIBLE CAT BED

(76) Inventors: Katherine Marie Boyer, Los Angeles, CA (US); Jay Christian Boyer, Los Angeles, CA (US)

(*) Notice: Subject to any disclaimer, the term of this patent is extended or adjusted under 35 U.S.C. 154(b) by 117 days.

(21) Appl. No.: 12/896,892

(22) Filed: Oct. 3, 2010

(65) Prior Publication Data
US 2012/0079986 A1 Apr. 5, 2012

(51) Int. Cl.
*A01K 29/00* (2006.01)
*A01K 1/035* (2006.01)

(52) U.S. Cl.
CPC .................................. *A01K 1/035* (2013.01)
USPC ........................ 119/28.5; 119/484; 119/706

(58) Field of Classification Search
USPC ............... 119/28.5, 416, 452, 453, 474, 482, 119/484, 485, 706; 5/3–6; D30/108, 109, D30/117–120
See application file for complete search history.

(56) References Cited

U.S. PATENT DOCUMENTS

| 269,723 | A | * | 12/1882 | Sell | 5/3 |
| 430,442 | A | * | 6/1890 | Sell | 5/6 |
| 1,058,984 | A | * | 4/1913 | Klok | 5/4 |
| 2,544,762 | A | * | 3/1951 | Lochridge | 5/6 |
| 3,035,277 | A | * | 5/1962 | Sproule | 5/3 |
| 3,581,707 | A | * | 6/1971 | Cook | 119/482 |
| 3,797,461 | A | * | 3/1974 | Breeden | 119/482 |
| 3,965,498 | A | * | 6/1976 | Boni | 5/6 |
| 5,440,768 | A | * | 8/1995 | Danin | 5/4 |
| 5,465,682 | A | * | 11/1995 | Chavallo, Jr. | 119/498 |
| 5,577,466 | A | * | 11/1996 | Luxford | 119/706 |
| 5,806,464 | A | * | 9/1998 | Willinger et al. | 119/706 |
| D520,190 | S | * | 5/2006 | Joyner | D30/108 |
| 7,578,264 | B2 | * | 8/2009 | Guard | 119/496 |
| 2005/0268859 | A1 | * | 12/2005 | Bello | 119/452 |
| 2008/0196675 | A1 | * | 8/2008 | Murrer | 119/706 |
| 2010/0077961 | A1 | * | 4/2010 | Lipscomb et al. | 119/28.5 |

* cited by examiner

*Primary Examiner* — Kristen C Hayes
(74) *Attorney, Agent, or Firm* — Vidas, Arrett & Steinkraus, P.A.

(57) ABSTRACT

A cat bed resembling a decorative table designed to encourage both the cat and the family from adopting practices that lead to the cat's destructive scratching of regularly used sofas, chairs, and/or similar pieces of furniture. The table comprises a concealable cat bed supported of the ground by leg and a concealable scratching surface. The decorative appearance of the table encourages placement within the living area of the home and in close proximity to regularly used pieces of furniture. The cat bed atop the furniture provides a comfortable place for the cat to rest and receive affection form a family member occupying an adjacent sofa, chair, or similar piece of furniture. Thus, the design of the furniture encourages behavior by both family and the cat that prevents the cat's scent from becoming embedded within a piece of furniture regularly used by the family.

11 Claims, 4 Drawing Sheets

CONVERTIBLE CAT BED

BACKGROUND OF THE INVENTION

1. Field of the Invention

The present invention relates to a decorative table that is capable of concealing a cat bed and scratching post within a living area of a home.

2. Description of the Related Art

Decorative tables are often placed within living areas of the home both for their utility and appearance. When positioned near regularly used pieces of furniture they are often used as convenient places to place refreshments, reading material and/or useful items, such as a lamp or remote control. Aside from their utility, decorative tables are often chosen and positioned to improve the aesthetic quality of a living area. Generally, this is done to please the family who occupies the home and to impress house guests.

Families whose members include a house cat often possess furniture that is pleasing and useful to that cat. Such furniture often includes a scratching post that allows the cat to perform needed scratching exercises. Often this furniture includes vertical surfaces covered with burlap, carpeting or other materials that cats find desirable to scratch. Another piece of cat furniture often possessed by families including cat members, is a cat bed. Though such furniture may have unique and interesting appearances, they often selected based on their utility to cat members of the family. Lacking the aesthetically pleasing appearance of decorative furniture, they are often hidden from guests and placed outside of living areas of the family home.

SUMMARY OF THE INVENTION

A decorative table suitable for display in the family living area of a home containing a concealed cat bed and scratching post provides a cat a space to rest and a suitable surface to scratch against close to the family. The decorative nature of the table and the ability to conceal the cat bed and scratching post when visitors are present encourages the family to place the table within the family's living area and in close proximity to an area of the home the family members regularly occupy. For instance, the decorative and concealable nature of the table encourages placement within reach of a regularly used sofa or chair. By encouraging placement in such close proximity to furniture regularly used by the family while providing the cat its own area to rest, the decorative table protects furniture regularly used by the family from destructive scratching.

Cats generally prefer to be near the family and receive attention from the family. Thus, when a family member is occupying the living area of the home and sitting on a regularly used sofa or chair, a cat will attempt to get close to the family member to receive affection, such as petting. This generally entails occupying the sofa or chair with the family member. By sharing the regularly used furniture with the family member the cat receives affection and its scent becomes embedded within the furniture. As olfactory orientated animals, cats prefer to scratch items within the home containing their scent. Consequently, if a regularly used piece of furniture becomes embedded with a cat's scent the cat will want to utilize the furniture for scratching exercises. By allowing the cat to occupy a favorite sofa or chair with the family to receive affection the family is encouraging the cat to adopt that piece of furniture as a scratching post.

The decorative table disclosed herein is designed to encourage both the cat and the family from adopting practices that lead to the cat's destructive scratching of regularly used sofas, chairs, and/or similar pieces of furniture. The decorative appearance of the table encourages placement within the living area of the home and in close proximity to regularly used pieces of furniture. The cat bed atop the furniture provides a comfortable place for the cat to rest and receive affection from a family member occupying an adjacent sofa, chair, or similar piece of furniture. Thus, the design of the furniture encourages behavior by both family and the cat that prevents the cat's scent from becoming embedded within a piece of furniture regularly used by the family.

Placement of the decorative table in close proximity to regularly used sofas, chairs, and similar pieces of furniture can be further encouraged by including a decorative top on the table adjacent to the cat bed where refreshments, reading material and/or useful items, such as a lamp or remote control, may be placed. Thus, placement near regularly used sofas, chairs, and similar pieces of furniture may be encouraged by a table top providing some utility to the occupier of the adjacent furniture. The utility of the decorative table may be further increased by including a storage space for housing items used by the family when occupying an adjacent or nearby sofa, chair, or similar piece of furniture.

Placement of the decorative table in close proximity to regularly used sofas, chairs, and similar pieces of furniture is also encouraged by the concealable nature of the table's cat bed and scratching post. When a family has company over it is desirable for the home, including the living area, to look nice. They do not want the living area, where company is most likely to be entertained, cluttered with a cat bed or scratching post. When company is present, however, a cat generally retreats from the living area and hides in an inconspicuous location of the home. During this period of hiding, the cat will not use the cat bed or scratching post. Accordingly, there is no need for the decorative table's cat bed and scratching post to be left accessible to the cat and visible to company. The cat bed and scratching post can then be hidden by closing a lid attached to the table as to cover the cat bed while revealing a top surface of the lid having a finished surface. Additionally, the scratch post may be concealed, if not done so by closing the lid, by closing a door, or plurality of doors, with a finished outer surface, which conceal the table's scratching surface. Thus, simply by closing a lid and door the table can be made to look like a decorative table commonly found within the living areas of homes, such as a coffee table or end table. The ability of the family to quickly conceal the cat bed and scratching post when entertaining further encourages placement of the decorative table in close proximity to regularly used sofas, chairs, and similar pieces of furniture.

When company is not present and the bed and scratching post are accessible to the cat, the cat may have to be encouraged to make use of the cat bed. This can be accomplished by the family placing the cat in the bed and then providing it affection when the cat attempts to receive affection by occupying a sofa, chair, or similar piece of furniture occupied by a family member. Eventually, the cat will associate occupying the cat bed with receiving affection and will enter the bed on its own when it wants affection from a family member occupying an adjacent chair, sofa, or similar piece of furniture. With regular use, the bed will become imbued with the cat's scent. This will naturally encourage the cat to use the decorative table's scratching surface when it wants to engage in scratching activities. The natural preference of the cat to use the decorative table's concealable scratching surface will protect furniture regularly used by the family from destructive scratching by the cat.

BRIEF DESCRIPTION OF THE DRAWINGS

The present invention will be shown and described with reference to the drawings of preferred embodiments and clearly understood in its details. Like elements of the various embodiments depicted within the figures are equivalently numbered.

DETAILED DESCRIPTION

Figure 1:
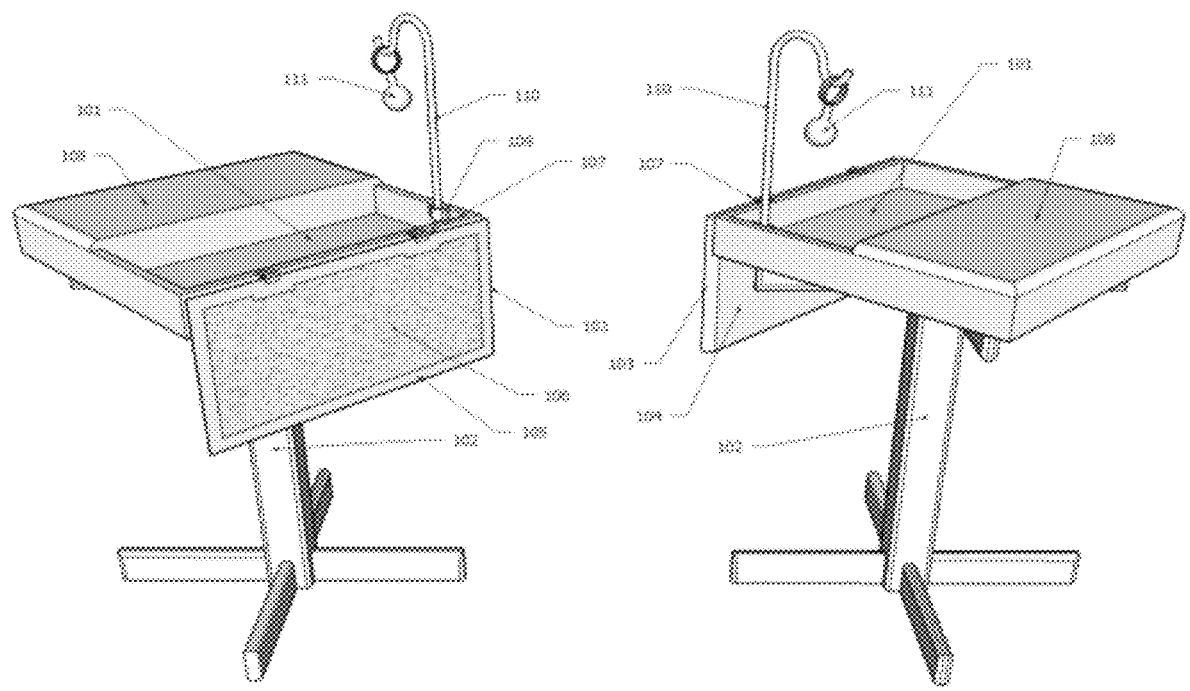
FIG. 1 depicts an embodiment of the present invention in the form of a pedestal table.

FIG. 1 depicts an embodiment of the present invention in the form of a pedestal table. As detailed in FIG. 1 this embodiment comprises a cat bed 101 supported of the ground by leg 102. Cat bed 101 is concealable by lid 103 which is sized to cover bed 101. As to give the embodiment depicted in FIG. 1 an appearance resembling that of a traditional decorative table, lid 103 contains a top surface 104 having a finished appearance. Lid 103 also includes a bottom surface 105 opposite the top surface to which a scratching surface 106 is attached. Scratching surface 106 may be made out of any material a cat would find desirable to scratch, such as but not limited to, carpeting or burlap. Other materials readily recognizable by those skilled in the art may also be used.

Regardless of the material used to construct scratching surface 106 it should be made accessible to the cat when lid 103 is not being used to conceal bed 101. The scratching surface may be made accessible by simply leaning lid 103 against leg 102, or any other portion of the invention, in such a manner as to give the cat access to scratching surface 106. Instead of leaning lid 103 against the invention, it may be desirable to connect lid 103 to cat bed 101 with hinge 107, as depicted in FIG. 1. Hinge 107 ideally should be arranged as to allow lid 103 to conceal cat bed 101 in the closed position while allowing lid 103 to hang down in the open position as to make scratching surface 106 accessible to a cat.

As to further encourage placement of the present invention in close proximity to regularly used sofas, chairs, and similar pieces of furniture a decorative top 108 where refreshments, reading material and/or useful items, such as a lamp or remote control, may be placed may be included adjacent to cat bed 101.

As to further encourage use of cat bed 101 by a house cat, the present invention may include toy hook 109 in proximity to cat bed 101 to which toy hanger 110 may be secured. Ideally toy hook 109 should be positioned such that toy 111 hanging from toy hanger 110 is accessible to a cat occupying bed 101.

Figure 2:
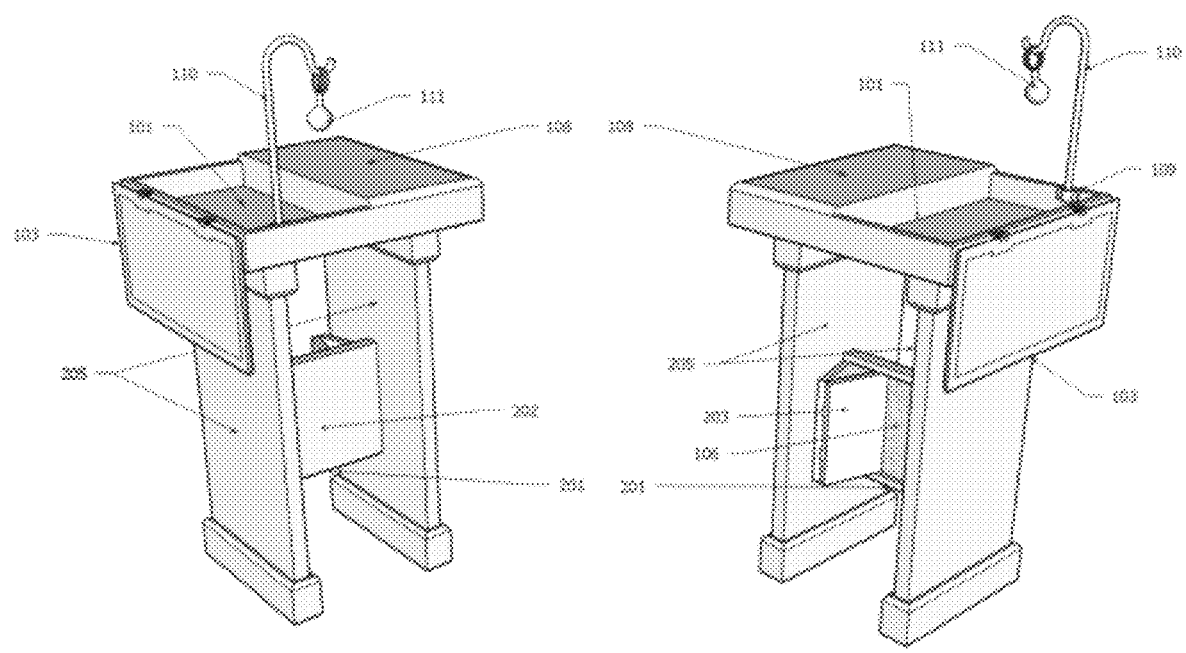
FIG. 2 depicts an embodiment of the present invention in the form of a trestle table.

It is also possible to construct the present invention to resemble a trestle table, as depicted in FIG. 2. In such an embodiment, the present invention would comprise a concealable cat bed 101 and a leg supporting cat bed 101 off the ground comprised of a plurality of trestles 205 with a plank 201 extending between them. Cat bed 101 is concealable by lid 103 which is sized to cover bed 101. As to give the embodiment depicted in FIG. 2 an appearance resembling that of a traditional decorative trestle table, lid 103 contains a top surface having a finished appearance. Plank 201 extending between trestles 205 has finished surface 202 and scratching surface 106 opposite finished surface 202. Scratching surface 106 is concealable by door 203 having an outer surface resembling finished surface 202. Door 203 should be attached to the present invention such that it is capable of concealing scratching surface 106 in the closed position while allowing scratching surface 106 to be accessible to a house cat in the open position. This may be achieved in many possible ways readily recognizable to those skilled in the art. For instance, door 203 may swing open to the left or right as to reveal scratching surface 106. Door 203 may also swing down or up to reveal scratching surface 206. It would also be possible, as depicted in FIG. 2, for door 203 to fold open as does a closet door to reveal scratching surface 106. It would also be possible for door 203 to slide open to reveal scratching surface 206. There are, of course, other manners in which door 203 may open to reveal and make accessible scratching surface 106 that are readily recognizable to those skilled in the art.

As with the embodiment depicted in FIG. 1, the embodiment depicted in FIG. 2 may include decorative top 108 where refreshments, reading material and/or useful items, such as a lamp or remote control, may be placed adjacent to cat bed 101 to further encourage placement of the present invention in close proximity to regularly used sofas, chairs, and similar pieces of furniture.

As to further encourage use of cat bed 101 by a house cat, the embodiment depicted in FIG. 2 may include toy hook 109 in proximity to cat bed 101 to which toy hanger 110 may be secured. Ideally toy hook 109 should be positioned such that toy 111 hanging from toy hanger 110 is accessible to a cat occupying bed 101.

Figure 3:
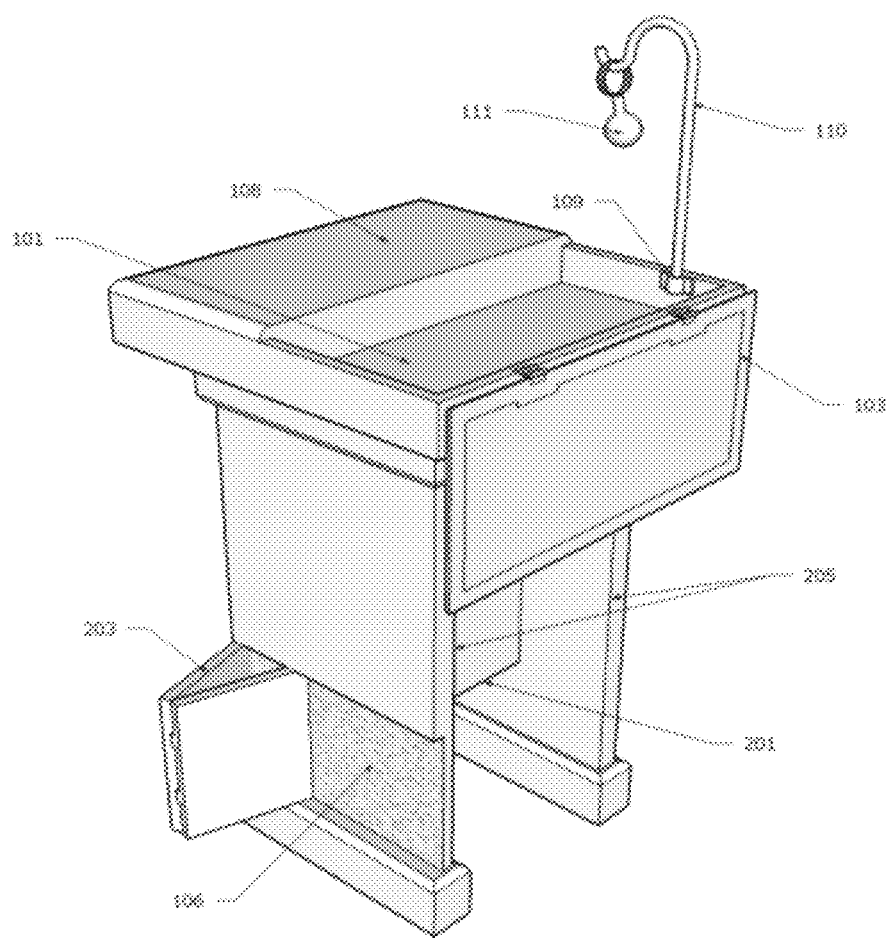
FIG. 3 depicts an alternative embodiment of the present invention in the form of a trestle table.
Figure 4:
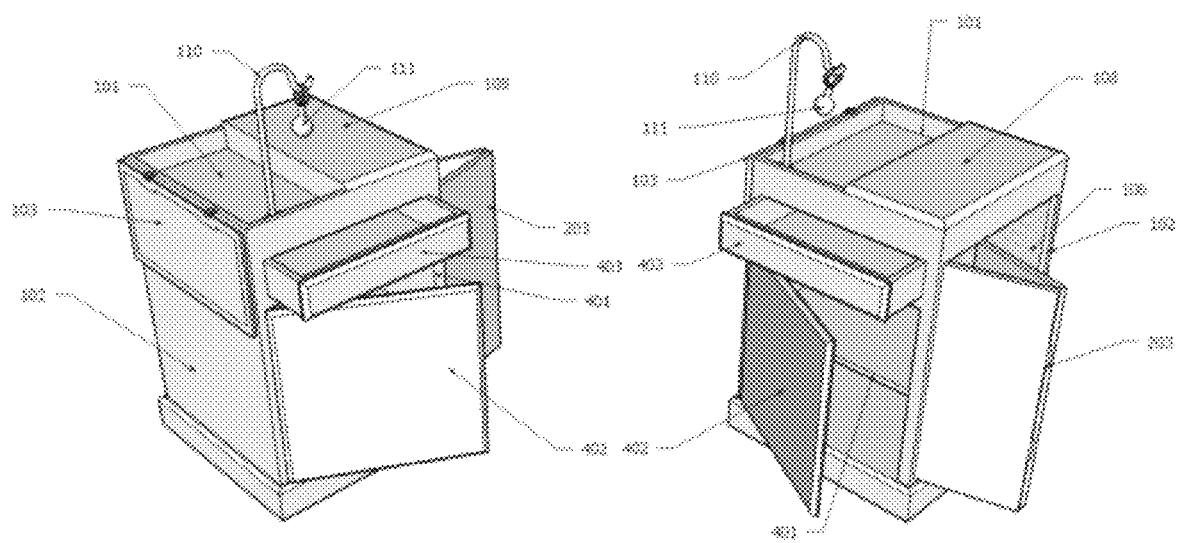
FIG. 4 depicts an embodiment of the present invention in the form of a cabinet style table.

Another possible embodiment of the present invention resembling a trestle table is depicted in FIG. 3. In this embodiment the scratching surface 106 is located on a one of the plurality of trestles 205. Scratching surface 106 is concealable by door 203 having an outer surface resembling the finished surface of the opposite leg. Door 203 should be attached to the present invention such that it is capable of concealing scratching surface 106 in the closed position while allowing scratching surface 106 to be accessible to a house cat in the open position. This may be achieved in many possible ways readily recognizable to those skilled in the art. For instance, door 203 may swing open to the left or right as to reveal scratching surface 106. Door 203 may also swing down or up to reveal scratching surface 206. It would also be possible, as depicted in FIG. 3, for door 203 to fold open as does a closet door to reveal scratching surface 106. It would also be possible for door 203 to slide open to reveal scratching surface 206. There are, of course, other manners in which door 203 may open to reveal and make accessible scratching surface 106 that are readily recognizable to those skilled in the art. As depicted in FIG. 4, the present invention may also be constructed to resemble a traditional cabinet style table. Such an embodiment would comprise a cat bed 101 support off the ground by a leg 102 constructed to have three vertical surfaces forming open rectangular geometry containing storage space 401 concealed by door 402. Other geometries are possible and the number of vertical surfaces will vary according to the geometry chosen. For instance, if a cylindrical geometry is chosen for cabinet 102 then it would only have one vertical surface.

The embodiment depicted in FIG. 4 also comprises a lid 103 sized to cover cat bed 101. As to give the embodiment depicted in FIG. 4 an appearance resembling that of a traditional decorative table, lid 103 contains a top surface having a finished appearance.

The embodiment depicted in FIG. 4 also contains a scratching surface 106 on one of the vertical surfaces concealed by a door 203 when in the closed position and accessible to a cat when door 203 is in the open position. This may be achieved in many possible ways readily recognizable to those skilled in the art. For instance, door 203 may swing open to the left or right as to reveal scratching surface 106. Door 203 may also swing down or up to reveal scratching surface 206. It would also be possible, as depicted in FIG. 4, for door 203 to fold open as does a closet door to reveal scratching surface 106. It would also be possible for door 203 to slide open to reveal scratching surface 106. There are, of course, other manners in which door 203 may open to reveal and make accessible scratching surface 106 that are readily recognizable to those skilled in the art. In addition to being mounted to conceal scratching surface 106 in the closed position and accessible in the open position, door 203 also has a finished outer surface resembling the finished surface of opposite vertical surface. As with the other depicted embodiments, the embodiment depicted in FIG. 4 may include decorative top 108 where refreshments, reading material and/or useful items, such as a lamp or remote control, may be placed adjacent to cat bed 101 to further encourage placement of the present invention in close proximity to regularly used sofas, chairs, and similar pieces of furniture. Additionally, leg 102 may contain a drawer 403 set within the storage space 401.

As to further encourage use of cat bed 101 by a house cat, the embodiment depicted in FIG. 4 may include toy hook 109 in proximity to cat bed 101 to which toy hanger 110 may be secured. Ideally toy hook 109 should be positioned such that toy 111 hanging from toy hanger 110 is accessible to a cat occupying bed 101.

Though specific embodiments have been illustrated and described herein, it will be appreciated by those of ordinary skill in the art that other arrangements and combinations of the invention's elements and/or their equivalents capable of achieving the same purpose may be substituted for the specific embodiments shown. It is to be understood that the above description and depicted embodiments are intended to be illustrative and not restrictive.

It should be noted and appreciated that elements described with singular articles such as "a", "an", and/or "the" and/or otherwise described singularly may be used in plurality. Likewise, it should be appreciated that elements described in plurality may be used singularly.

The scope of the present invention should be determined with reference to the appended claims, along with the full scope of equivalents to which such claims are entitled.

We claim:

1. A decorative table comprising:
   a. a concealable cat bed;
   b. a leg supporting the cat bed off the ground;
   c. a lid sized to conceal the cat bed, said lid comprising a top surface having a finished appearance and a bottom surface opposite the top surface;
   d. a scratching post on the leg concealed by a door or plurality of doors having a finished outer surface in a closed position and accessible to a house cat when the doors are in an open position.

2. The decorative table of claim 1 further comprising a top adjacent to cat bed with a finished appearance resembling the finished appearance of the top surface of the lid.

3. The decorative table of claim 1 wherein the leg comprises a pair of trestles and a plank extending a between the trestles, the plank having at least one finished surface.

4. The decorative table of claim 3 wherein the scratching post is opposite the finished surface of the plank and the finished outer surface of door or plurality of doors resembles the finished surface of the plank.

5. The decorative table of claim 3 wherein the scratching post is on one of the trestles.

6. The decorative table of claim 1 further comprising a storage space within said leg.

7. The decorative table of claim 6 further comprising a door or plurality of doors concealing the storage space.

8. The decorative table of claim 6 further comprising a drawer set within the storage space.

9. The decorative table of claim 1 further comprising a toy hook in proximity to the cat bed.

10. The decorative table of claim 9 further comprising a toy hanger secured by the toy hook.

11. The decorative table of claim 10 further comprising a toy hanging from the toy hanger.

* * * * *